US010127456B2

(12) United States Patent
Morofuji

(10) Patent No.: US 10,127,456 B2
(45) Date of Patent: Nov. 13, 2018

(54) INFORMATION PROCESSING APPARATUS THAT CORRECTS IMAGE DISTORTION TO SET A PASSAGE DETECTION LINE, INFORMATION PROCESSING METHOD, AND MEDIUM

(71) Applicant: CANON KABUSHIKI KAISHA, Tokyo (JP)

(72) Inventor: Tsuyoshi Morofuji, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 15/077,985

(22) Filed: Mar. 23, 2016

(65) Prior Publication Data
US 2016/0284064 A1    Sep. 29, 2016

(30) Foreign Application Priority Data

Mar. 27, 2015 (JP) ................................. 2015-067464

(51) Int. Cl.
*G06K 9/00* (2006.01)
*H04N 5/232* (2006.01)
*H04N 5/357* (2011.01)

(52) U.S. Cl.
CPC ..... *G06K 9/00771* (2013.01); *H04N 5/23238* (2013.01); *H04N 5/3572* (2013.01)

(58) Field of Classification Search
USPC .............. 1/1; 250/221; 348/36, 148; 377/10; 382/103
See application file for complete search history.

(56) References Cited

U.S. PATENT DOCUMENTS

| 5,489,940 | A  | * | 2/1996  | Richardson | .......... | H04N 5/3572 |
|           |    |   |         |            |            | 348/315 |
| 5,574,762 | A  | * | 11/1996 | Sato       | ................... | G06K 9/00778 |
|           |    |   |         |            |            | 377/10 |
| 7,176,441 | B2 | * | 2/2007  | Sumitomo   | ............ | G06M 1/101 |
|           |    |   |         |            |            | 250/221 |
| 8,897,492 | B2 | * | 11/2014 | Chou       | ....................... | G07C 9/00 |
|           |    |   |         |            |            | 382/103 |
| 8,897,621 | B2 | * | 11/2014 | Okegawa    | .............. | G06T 3/0025 |
|           |    |   |         |            |            | 348/169 |
| 8,908,037 | B2 | * | 12/2014 | Inui       | ...................... | H04N 17/002 |
|           |    |   |         |            |            | 348/148 |

(Continued)

FOREIGN PATENT DOCUMENTS

| JP | 3183320 B2 | 7/2001 |
| JP | 3218521 B2 | 10/2001 |

*Primary Examiner* — Xuemei Chen

(74) *Attorney, Agent, or Firm* — Rossi, Kimms & McDowell LLP

(57) ABSTRACT

There is provided with an information processing apparatus. A designation of a position in a wide range captured image captured by an image capture apparatus that has an optical system for capturing the wide range captured image is received. A corrected partial region image that is obtained by performing a distortion correction, that reduces a distortion due to the optical system of the image capture apparatus, on a partial image corresponding to the position designated on the wide range captured image is generated. A passage detection line, for detecting a passage of a moving object, is set on the corrected partial region image in accordance with a designation by a user.

19 Claims, 7 Drawing Sheets

(56) References Cited

U.S. PATENT DOCUMENTS

| | | | |
|---|---|---|---|
| 9,087,256 B2* | 7/2015 | Yu | H04N 7/18 |
| 9,153,014 B2* | 10/2015 | Yu | G06T 5/006 |
| 9,396,529 B2* | 7/2016 | Tsubota | G06T 3/00 |
| 9,495,600 B2* | 11/2016 | Heu | G06K 9/00778 |
| 9,607,358 B2* | 3/2017 | Takenaka | H04N 5/23238 |
| 9,704,259 B2* | 7/2017 | Ito | G06T 7/246 |
| 2013/0293672 A1* | 11/2013 | Suzuki | H04N 5/23238 |
| | | | 348/36 |
| 2014/0267589 A1* | 9/2014 | Matsubara | H04N 5/23238 |
| | | | 348/36 |
| 2015/0109452 A1* | 4/2015 | Fujimatsu | H04N 7/181 |
| | | | 348/159 |
| 2016/0176344 A1* | 6/2016 | Wang | H04N 5/23229 |
| | | | 348/36 |
| 2016/0224829 A1* | 8/2016 | Chou | G06T 7/11 |
| 2016/0275534 A1* | 9/2016 | Iwai | G06Q 30/06 |
| 2016/0314665 A1* | 10/2016 | Idaka | G08B 13/19602 |
| 2017/0041538 A1* | 2/2017 | Choi | G06T 3/0062 |
| 2017/0116724 A1* | 4/2017 | Yin | G06T 7/20 |
| 2017/0185828 A1* | 6/2017 | Yamamoto | G06T 7/292 |

\* cited by examiner

INFORMATION PROCESSING APPARATUS THAT CORRECTS IMAGE DISTORTION TO SET A PASSAGE DETECTION LINE, INFORMATION PROCESSING METHOD, AND MEDIUM

BACKGROUND OF THE INVENTION

Field of the Invention

The present invention relates to an information processing apparatus, an information processing method, and a storage medium.

Description of the Related Art

Previously, to monitor for acts of theft or illegal acts in a store or a parking place, or to monitor entering or the like of a third party from outside, a monitoring camera has been positioned in the store, the parking place, on a fence that encloses a specific building, or the like. The need to automatically measure and analyze behavior of people in such a monitoring camera system to more efficiently perform monitoring and management operation is increasing. For example, by automatically analyzing how many people are currently entering/leaving an establishment and at what speed they are moving, it is possible to understand a partial traffic amount in the establishment, or a usage condition of the establishment. In addition, it is possible to obtain information for analyzing congestion around the observation area, and for guiding a crowd. Such a function is also useful in a community facility, a recreational facility, or the like.

Japanese Patent No. 3183320 recites a method that counts, by direction, people for which a movement direction is not constant, such as pedestrians who gather and depart at a gateway. In addition, a count line used when counting being a curved line that is matched to a distortion of a lens is disclosed. Japanese Patent No. 3218521 discloses a method that sets a virtual gate for an observed image, and performs processing for detecting, in real-time, a moving body that goes across the virtual gate.

SUMMARY OF THE INVENTION

According to an embodiment, an information processing apparatus comprises: a reception unit configured to receive a designation of a position in a wide range captured image captured by an image capture apparatus that has an optical system for capturing the wide range captured image; a generation unit configured to generate a corrected partial region image that is obtained by performing a distortion correction, that reduces a distortion due to the optical system of the image capture apparatus, on a partial image corresponding to the position designated on the wide range captured image; and a setting unit configured to set a passage detection line, for detecting a passage of a moving object, on the corrected partial region image in accordance with a designation by a user.

According to another embodiment, an information processing method comprises: receiving a designation of a position in a wide range captured image captured by an image capture apparatus that has an optical system for capturing the wide range captured image; generating a corrected partial region image that is obtained by performing a distortion correction, that reduces a distortion due to the optical system of the image capture apparatus, on a partial image corresponding to the position designated on the wide range captured image; and setting a passage detection line, for detecting a passage of a moving object, on the corrected partial region image in accordance with a designation by a user.

According to still another embodiment, a non-transitory computer-readable medium stores a program thereon, the program causing a computer to perform a method comprising: receiving a designation of a position in a wide range captured image captured by an image capture apparatus that has an optical system for capturing the wide range captured image; generating a corrected partial region image that is obtained by performing a distortion correction, that reduces a distortion due to the optical system of the image capture apparatus, on a partial image corresponding to the position designated on the wide range captured image; and setting a passage detection line, for detecting a passage of a moving object, on the corrected partial region image in accordance with a designation by a user.

Further features of the present invention will become apparent from the following description of exemplary embodiments (with reference to the attached drawings).

DESCRIPTION OF THE EMBODIMENTS

Figure 1:
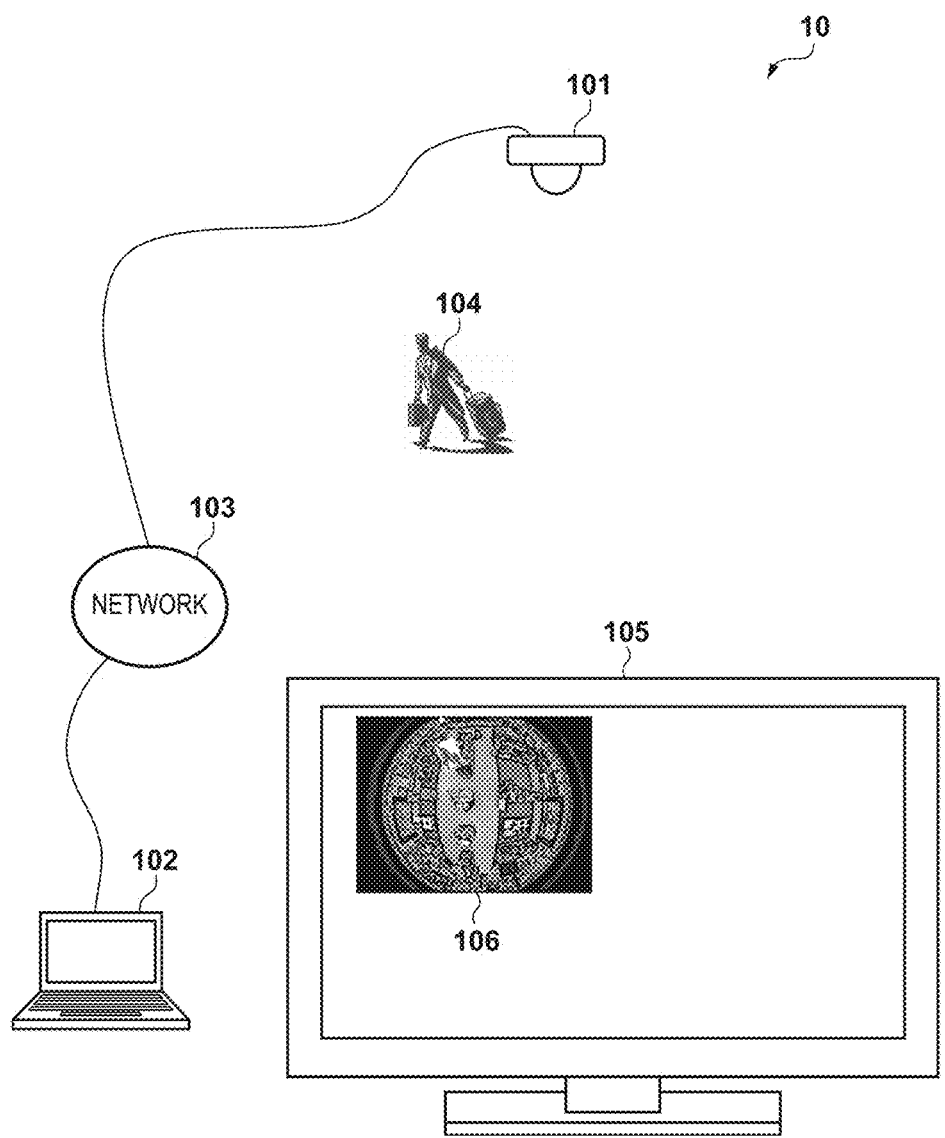
FIG. 1 is an overview block diagram that illustrates a configuration of an image capture system according to a first embodiment.

When measuring a number of objects that pass a measurement line for example, to obtain desired measurement data, it is necessary to accurately set the position of the measurement line in a captured image. However, for the monitoring camera, if distortion of the captured image obtained in order to widen the image capture range is large, it is not easy to set a desired measurement portion in the captured image. For example, in an edge portion of an image obtained by an omnidirectional camera that is provided with a fish-eye lens, a photographic subject becomes smaller, and accordingly the measurement line to set also becomes smaller. In this way, it has not been easy to accurately perform position designation of a desired portion in a captured image.

An embodiment of the present invention can support accurately designating a desired portion intended by a user in a captured image.

Below, embodiments of the present invention are explained in detail based on the attached drawings. However, that is not to say that present invention is limited to the following embodiments.

[First Embodiment]

Below, a first embodiment of the present invention is explained with reference to the drawings. Note that, in each drawing, for common configuration elements, for example configuration elements that are the same or similar, the same reference numeral is added. Below, duplicate explanation for common configuration elements is omitted.

FIG. 1 illustrates an example of an image capture system 100 according to the first embodiment. The image capture system according to the present embodiment is provided with a camera 101 that is an image capture apparatus as well as an information processing apparatus, and a client apparatus 102 that is an information processing apparatus. The camera 101 and the client apparatus 102 are connected via a network 103. The camera 101 captures a moving image, which is configured by a plurality of captured images. A captured image captured by the camera 101 has some distortion. Although in one embodiment the camera 101 is an omnidirectional camera that has an optical system for capturing a wide range image, such as a fish-eye lens, the camera 101 is not limited to this. The camera 101 is, for example, mounted to a ceiling, and can be used to monitor an object such as a person. A captured image obtained by the camera 101 is transmitted to the client apparatus 102 via the network 103. In addition, a captured image obtained by the camera 101 may be transmitted to an external apparatus, such as a recording server (not shown).

The client apparatus 102 obtains a moving image from the camera 101 or from an external apparatus, such as a recording server (not shown). The client apparatus 102 has a monitor 105, and can display the moving image on the monitor 105. FIG. 1 illustrates a captured image 106, which is a wide range captured image captured by the camera. 101 and displayed on the monitor 105. Here, in a moving image captured by the camera 101, a monitoring target person 104 in a path is captured.

Figure 2:
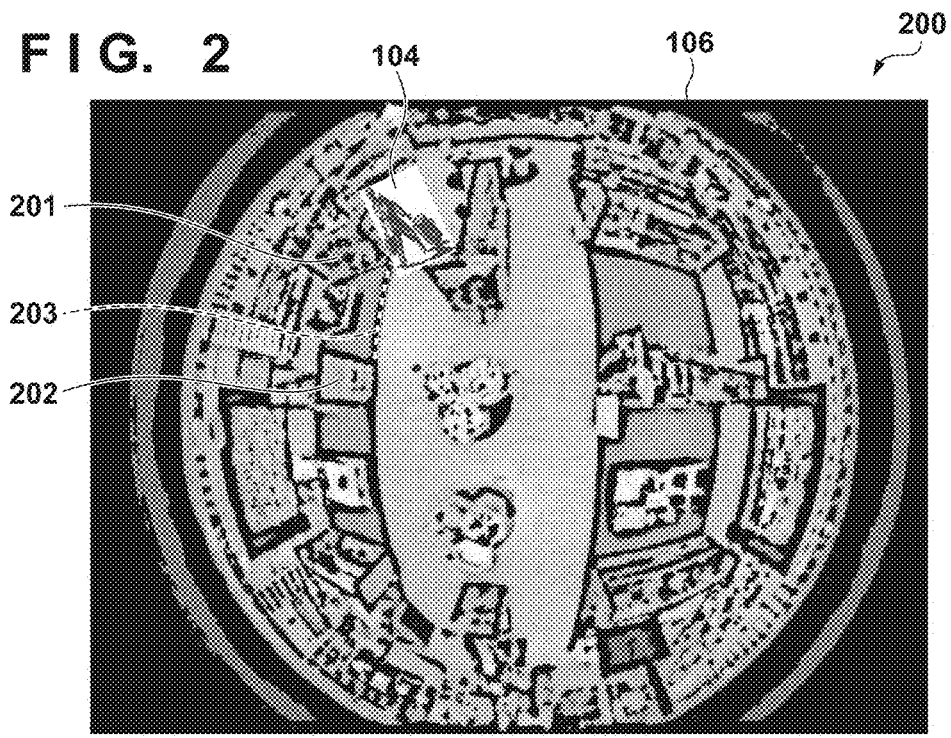
FIG. 2 is a view for illustrating an example of a display in a client apparatus according to the first embodiment.

Next, processing realized by the present embodiment is explained with reference to FIGS. 2-4. FIG. 2 illustrates an example of a screen 200 displayed on the monitor 105, in a display mode that displays a moving image captured by the camera 101. In the screen 200, the captured image 106 captured by the camera 101, which is attached to a ceiling of a store, is displayed. The captured image 106 is an omnidirectional image of the inside the store. As described above, because the camera 101 captures a moving image comprised by a plurality of captured images, the captured image 106 can change moment by moment.

In the present embodiment, the client apparatus 102 has a detection unit that counts a number of people that pass a set detection line, by referring to the moving image captured by the camera 101. In the captured image 106, store shelves 201 and 202 are included. Here, the user is attempting to set a position of a detection line 203 for the user to count the number of people who pass between the store shelves 201 and 202. Here, the "position of the detection line" to set includes a position, shape, and length (magnitude) of the detection line.

For the user to set the position of the detection line 203, the client apparatus 102 transit to a setting mode in accordance with an instruction of the user. In one embodiment, when a user has designated a desired position on the captured image 106, the client apparatus 102 can transit to a setting mode. In other words, the user can roughly and provisionally designate the position of the detection line on the captured image 106, and the user can confirm or correct the provisionally designated position in the setting mode. Below, it is assumed that the user has designated the position of the detection line 203 on the captured image 106. Naturally, because the captured image 106 is distorted in the proximity of the store shelves 201 and 202, accurately setting the detection line 203 between the store shelves 201 and 202 on the captured image 106 is difficult for a user.

Figure 3:
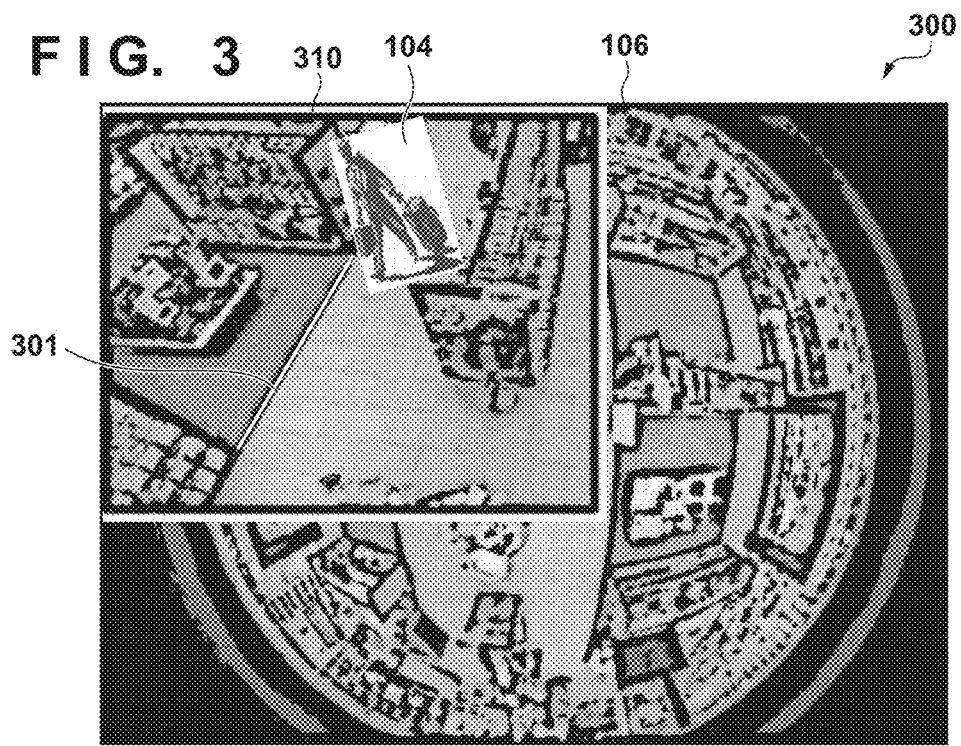
FIG. 3 is a view for illustrating an example of a display in the client apparatus according to the first embodiment.

FIG. 3 illustrates an example of a screen 300, which is displayed on the monitor 105 in the setting mode. The screen 300 includes the captured image 106, which is a wide range captured image, and a corrected partial region image 310. The corrected partial region image 310 is a portion of the captured image 106 in which distortion correction that reduces distortion due to the optical system of the camera 101 has been applied. By referring to a partial image in which distortion has been reduced in this way, a user can more accurately set the position of a detection line 301. Note that the corrected partial region image 310 is a partial image corresponding to a predetermined size, centered on a position designated on the captured image 106, for which distortion correction has been performed.

In one embodiment, a user can designate, on the corrected partial region image 310, the position of the detection line 301 on the captured image. An instruction that designates the position of the detection line 301 is sent to the camera 101, and used to set a detection line at the position in accordance with the instruction. A pop-up display for the corrected partial region image 310 is performed in a case where a user designates a position in the captured image 106 while a user interface for setting the detection line 301 is displayed. The designation of the position of the detection line 301, for example, can be performed by designating two points in the captured image 106. The designated two points become end points of the detection line 301. In addition, for example, configuration may be taken to cause display of a border that indicates a region for which to generate the corrected partial region image 310 from the captured image 106 on the captured image 106 in accordance with designation of the border by the user.

In addition, configuration may be taken such that positional information indicating a position on the corrected partial region image 310 corresponding to the position of the detection line 203 designated on the captured image 106 is further displayed on the monitor 105. For example, a detection line corresponding to a position of the detection line 203 provisionally designated on the captured image 106 may be displayed on the corrected partial region image 310. Because pixels in the image before distortion correction and pixels in the image after distortion correction have an almost one-to-one correspondence, it is possible to calculate a position on the corrected partial region image 310 after distortion correction that corresponds to a position on the captured image 106 before distortion correction. Thereafter, by correcting the position of the detection line displayed on the corrected partial region image 310, the user can designate the position of the detection line 301. An instruction that corrects the position of the detection line 301 is sent to the camera 101, and is used to set a detection line at the position in accordance with the instruction.

If positioning of the detection line displayed on the corrected partial region image 310 is satisfactory, a user can simply authorize the result of the provisional designation. In other words, a user can transmit a user instruction that sets a position on the corrected partial region image 310 indicated by the information of the position displayed on the monitor 105 as the position designated by the user. This instruction is sent to the camera 101, and subsequently the camera 101 registers the position of the detection line 203 that has been designated on the captured image 106.

In one embodiment, the corrected partial region image 310 is an enlarged image that includes the detection line provisionally designated on the captured image 106 by the user. In the example of FIG. 3, for example, the corrected partial region image 310 includes a position of the detection line 203 designated on the captured image 106 by the user. By virtue of such a configuration, position designation of the detection line 301 by a user becomes easier. Reworded, by designating the position on the captured image 106, a user can perform designation, of a partial region from the captured image 106. With this, the corrected partial region image 310 obtained by performing distortion correction on the partial region, from the captured image 106, which is designated by the user is displayed on the monitor 105. In another embodiment, a user can designate a desired region in the captured image 106. In such a case, it is possible to display, on the monitor 105, the corrected partial region image 310 obtained by performing a distortion correction on the desired region in the captured image 106 that is designated by the user.

A display size of the corrected partial region image 310 and a magnification factor of the corrected partial region image 310 are not particularly limited. For example, it is possible to display the corrected partial region image 310 in accordance with a display size and a magnification factor that are set in advance. It is possible to display the corrected partial region image 310 in accordance with a display size and a magnification factor designated by a user, but there is a need for the provisionally designated detection line to be included in the corrected partial region image 310. Furthermore, in FIG. 3 although the corrected partial region image 310 is overlapped on the captured image 106, a display style is not particularly limited, and the captured image 106 and the corrected partial region image 310 may be displayed in parallel.

When setting of the detection line 301 by a user is finished, the client apparatus 102 transitions to the display mode again. For example, the client apparatus 102 can transition to the display mode in accordance with a user input that indicates termination of the setting mode. At this point, the camera 101 calculates a position of a detection line 401 on the captured image that corresponds to the position of the detection line 301 that has been designated on the corrected partial region image 310. Because, as described above, pixels in the image before distortion correction and pixels in the image after distortion correction have an almost one-to-one correspondence, it is possible to calculate a position on the corrected partial region image 310 after distortion correction that corresponds to a position on the captured image before distortion correction by performing an inverse transformation of the distortion correction.

With such a configuration, when the position of the detection line 401 on the captured image is determined, the camera 101 transmits, to the client apparatus 102, information that indicates the position of the detection line on the captured image and the moving image which includes the captured image. The monitor 105 of the client apparatus 102, which has received this information, renders, based on the information that indicates the position of the received detection line, a line that indicates the position of the detection line 401, and displays the rendered line at a corresponding position on a captured image 400. Reworded, the camera 101 controls the monitor 105 so as to display a graphic image that shows the detection line at the position of the detection line, in other words a position on the captured image 400 that corresponds to the position designated by the user on the corrected partial region image 310.

Figure 4:
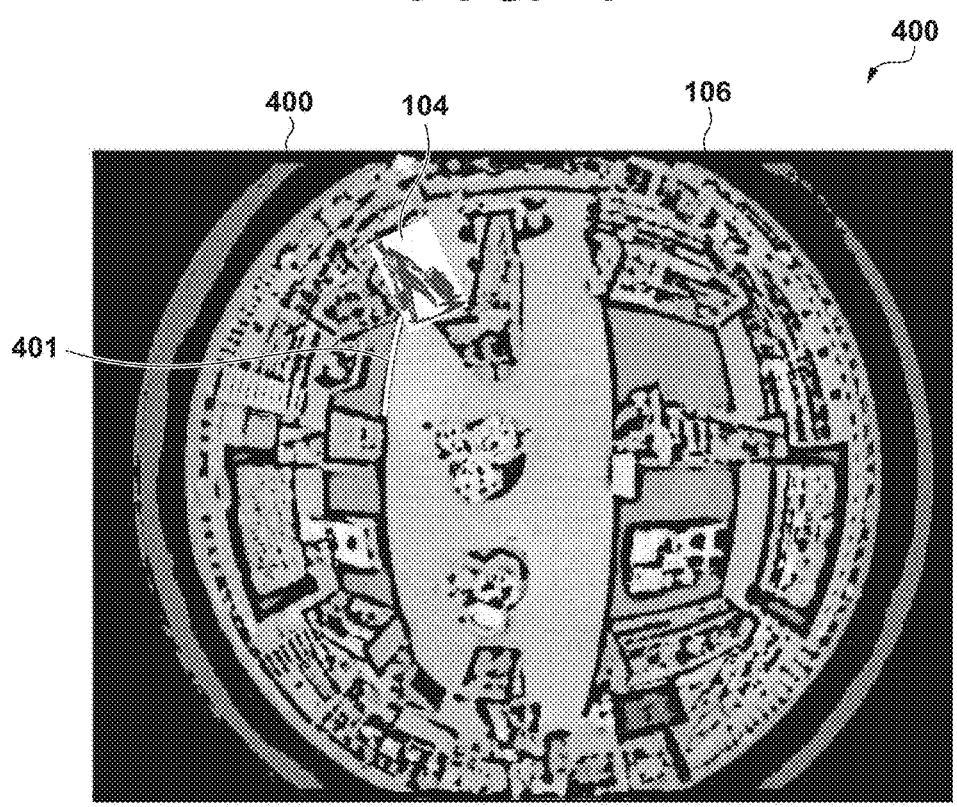
FIG. 4 is a view for illustrating an example of a display in the client apparatus according to the first embodiment.

For example, as illustrated in FIG. 4, a display of a graphic image that indicates the position of the detection line on the captured image 400 and the captured image 106 is performed on the monitor 105 as so that the position of the detection line 401 in the captured image 400 is shown on the captured image 400. In addition, the client apparatus 102, having received the information, can detect an object that passes the detection line 401 on the moving image. In particular, as described above, the client apparatus 102 can count a number of objects that pass the detection line 401 on the captured image.

Figure 5:
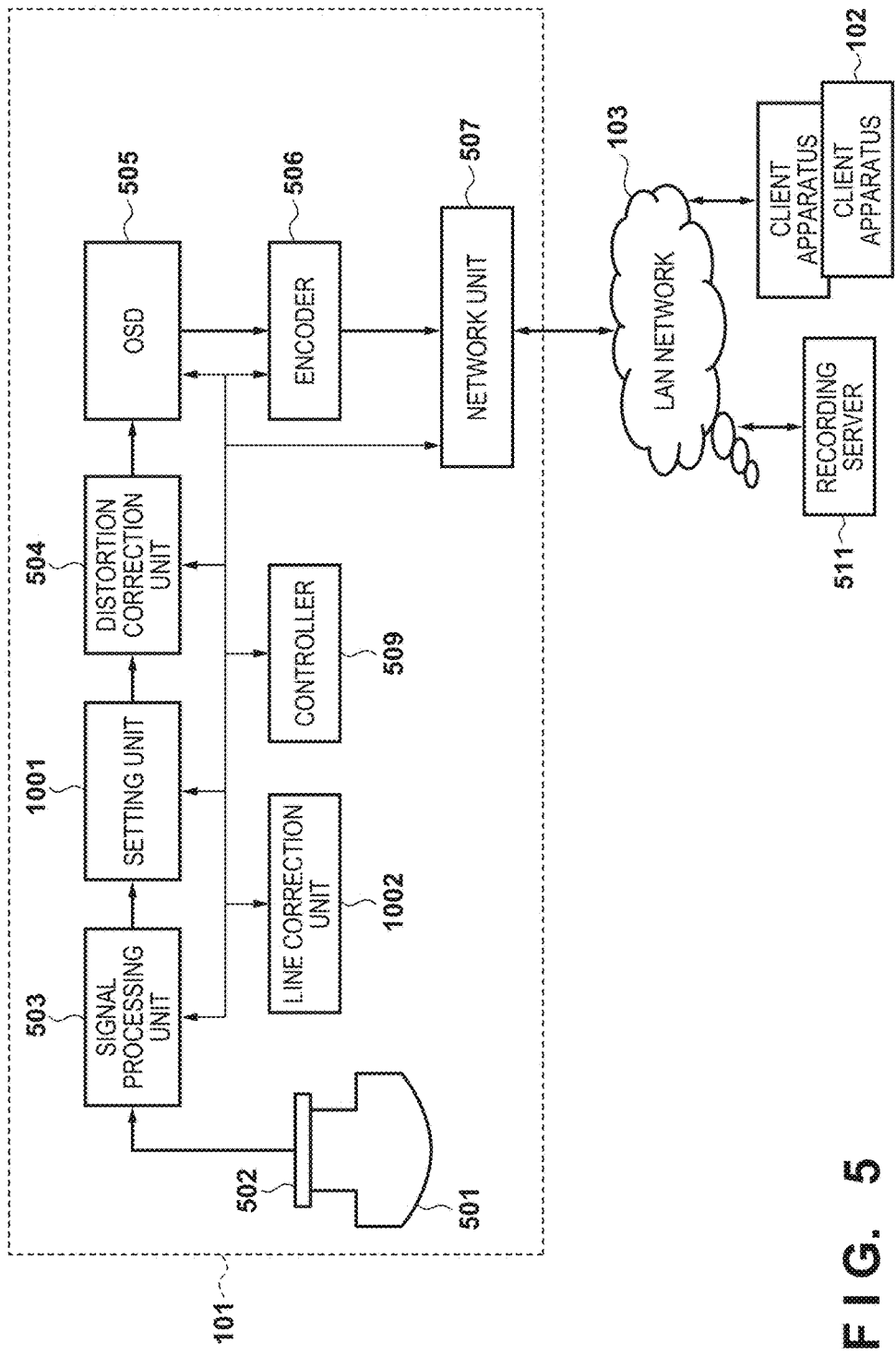
FIG. 5 is an overview block diagram that illustrates a configuration of a camera according to the first embodiment.

Next, using FIG. 5, explanation is given of a flow of a video signal and a control signal. The camera 101 has a fish-eye lens unit 501, an image sensor 502, a signal processing unit 503, a distortion correction unit 504, an OSB 505, an encoder 506, and a network unit 507. In the present embodiment the camera 101 generates an image that is displayed on the monitor 105 of the client apparatus 102.

An optical image of a photographic subject enters the image sensor 502 via the fish-eye lens unit 501. The image sensor 502 converts the optical image to an electrical signal, and sends it to the signal processing unit 503. By performing various image processing, such as color separation processing, white balance processing, or gamma correction, on the electrical signal, the signal processing unit 503 generates a captured image.

The distortion correction unit 504 performs distortion correction on the captured image. More specifically, the distortion correction unit 504 performs distortion correction that reduces distortion due to the optical system of the image capture apparatus, for example the fish-eye lens unit 501 or the like, on the captured image captured by the image capture apparatus, which includes the fish-eye lens unit 501 and the image sensor 502. For example, the distortion correction unit 504 can perform distortion correction that supports various display modes, in accordance with a request from the client apparatus 102. As a display mode, in addition to an omnidirectional image mode that normally does not require distortion correction, a 360-degree panorama mode, a 180-degree double panorama mode, a four-screen segmentation mode, an eight-screen segmentation mode, or the like are given, and appropriate distortion correction corresponding to each display mode is performed. The corrected partial region image generated in accordance with the distortion correction processing by the distortion correction unit 504 includes at least a portion of an image obtained by performing distortion correction on the captured image in this way.

A configuring unit 1001 performs configuration of the detection line as described above. Specifically, the configuring unit 1001 converts the position of the detection line 301 designated on the corrected partial region image 310 by the user to a corresponding position on the captured image. The configuring unit 1001 then records the position of the detection line on the captured image that is obtained by the converting. The recorded position of the detection line is used to count a number of objects that pass the detection line on the captured image.

The OSD 505 can overlap various information onto the captured image or the corrected partial region image. For example, the OSD 505 can overlap information indicating the position of the set detection line onto a captured image (an omnidirectional image). As a concrete example, it is possible to indicate the position of the detection line on the captured image by preparing an image layer of the detection line that is set so as to curve in accordance with the distortion due to the camera 101, and overlapping the image layer onto the captured image.

In addition, the OSD 505 can overlap text that indicates a time, a date, a camera name and capturing direction, or the like onto a corrected partial region image (for example, a 360-degree panorama image, a 180-degree double panorama image, a four-screen segmented image, an eight-screen segmented image, or the like). Upon overlapping text information onto the captured image (omnidirectional image), there is a possibility that the text will deteriorate after distortion correction. For this reason, the OSD 505 can overlap text that indicates the time, date, camera name and capturing direction, or the like on a black image region of the captured image (omnidirectional image). In such a case, the black image region can be excluded from a subject of distortion correction. In addition, these pieces of information can be embedded as data into the black image region. In such a case, when loading an obtained image, the client apparatus 102 can obtain these pieces of information.

The encoder 506 performs encoding processing on a captured image, a corrected partial region image, or an image to which information has been overlapped by the OSD 505. The network unit 507 distributes encoded data generated by encoding processing to an external apparatus, such as the client apparatus 102 or a recording server 511, via the network 103. With such a configuration, the encoder 506 can perform, via the network unit 507, a display control that controls a display apparatus, such as the monitor 105, so as to display an image. For example, the encoder 506 can cause a corrected partial region image that includes at least a portion of an image, that is generated in accordance with distortion correction processing by the distortion correction unit 504 and obtained by performing distortion correction on a captured image, to be displayed on the monitor 105.

In addition, a control signal is sent to the camera 101 from an external apparatus, such as the client apparatus 102 or the recording server 511. This control signal is received via the network. 103 by the network unit 507, and analyzed by a controller 509.

The controller controls each unit that the camera 101 has, in accordance with a result of the analysis of the control signal. For example, the controller 509 can obtain, from the client apparatus 102, a position of the detection line designated by the user on the captured image or on the corrected partial region image to set the detection line. In this way the controller 509 can receive designation of a partial region of the captured image, or can receive designation of a position on the captured image in addition, when a signal that requests a 180-degree double panorama image is transmitted from the client apparatus 102, the controller 509 can control the distortion correction unit 504 so as to generate a 180-degree double panorama image.

Figure 6:
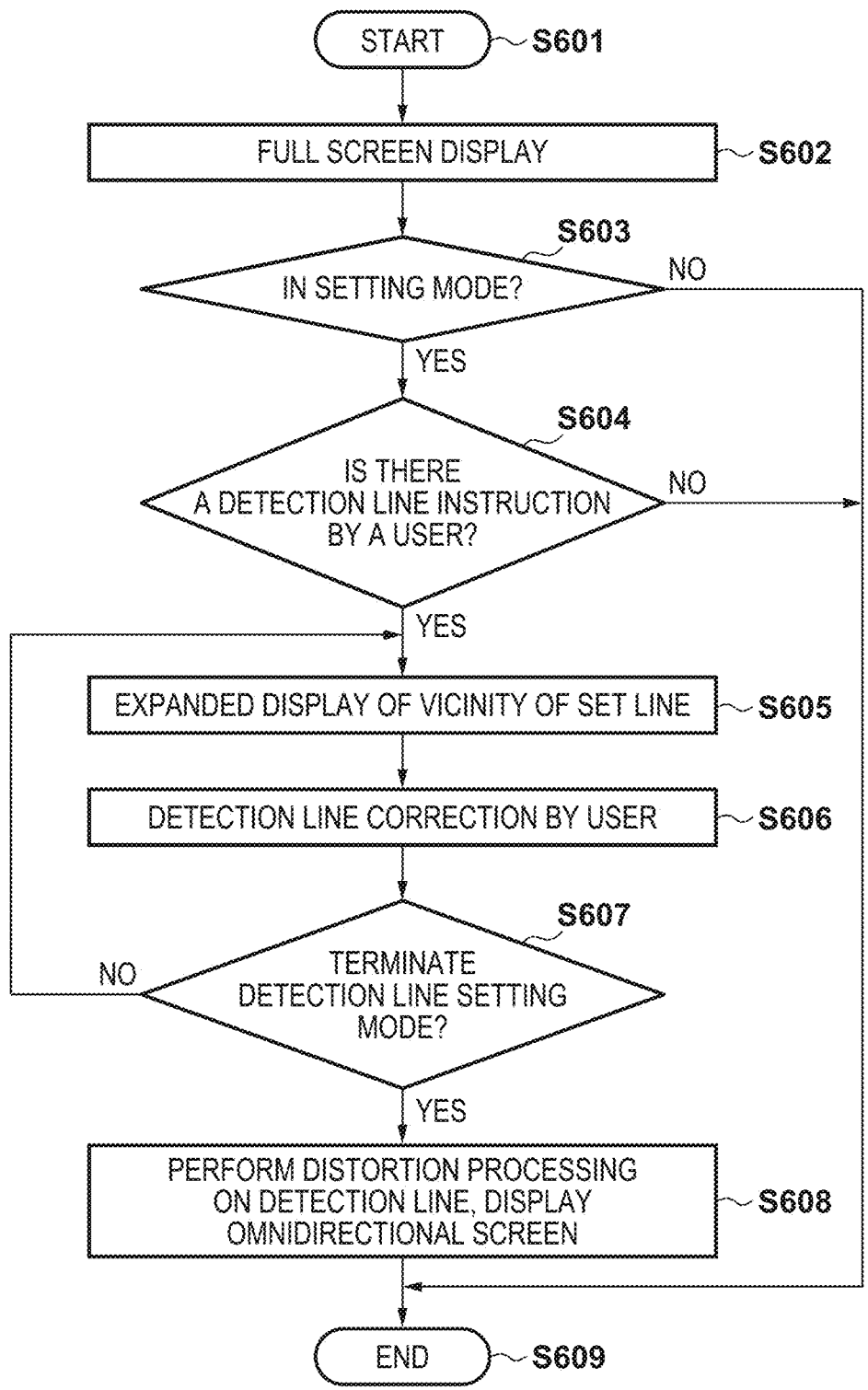
FIG. 6 is a flowchart of processing according to the first embodiment.

Next, a flow of processing according to the present embodiment is explained with reference to the flowchart of FIG. 6. In step S601 processing starts. In step S602 the network unit 507 transmits a captured image (omnidirectional image) 106 generated by the distortion correction unit 504 to the client apparatus 102. The client apparatus 102 displays the transmitted captured image 106 on the monitor 105.

In step S603 the controller 509 determines whether the client apparatus 102 is currently in the setting mode for setting the detection line. If in the setting mode, the processing proceeds to step S604. If not in the setting mode, the processing proceeds to step S609.

In step S604 the controller 509 determines whether the position of the detection line has been designated on the captured image 106, and if the position of the detection line has been designated, the controller 509 obtains the position of the designated detection line. Designation of the position of the detection line, as described above, for example can be performed by a user designating the position of the detection line on the captured image 106. If the position of the detection line on the captured image 106 has been designated, the processing proceeds to step S605. If the position of the detection line on the captured image 106 has not been designated, the processing proceeds to step S609.

In step S605, the encoder 506, via the network unit 507, transmits the corrected partial region image 310 generated by the distortion correction unit 504 to the client apparatus 102. The corrected partial region image 310 includes an image obtained by performing distortion correction on an image at the position on the captured image 106 designated in step S604, in other words the image to which distortion correction has been performed at the position of the designated detection line. The client apparatus 102 displays the transmitted the corrected partial region image 310 on the monitor 105.

In step S606, correction of the position of the detection line by the user is performed while referring to the corrected partial region image 310 displayed on the monitor 105 as described above.

In step S607 the client apparatus 102 determines whether to terminate the setting mode. If the setting mode is terminated, the processing proceeds to step S608. For example, if an instruction that terminates the setting mode is input by a user, the client apparatus 102 can terminate the setting mode. If in the setting mode is not terminated, the processing returns to step S605. In such a case, in step S605 a new corrected partial region image is displayed on the monitor 105.

In step S608, the client apparatus 102 transitions to the display mode. In other words, the encoder 506, via the network unit 507, transmits the captured image generated by the distortion correction unit 504 to the client apparatus 102. In addition, the configuring unit 1001 converts the position of the detection line designated on the corrected partial region image 310 in step S606 into a position on the captured image, as described above.

A position of the detection line obtained by the conversion is indicated in the captured image 400 that the encoder 506 transmits to the client apparatus 102. Then the client apparatus 102 displays the transmitted captured image 400 on the monitor 105.

In step S609, processing ends. It is also possible to return to step S601 after step S609 and display a new captured image on the monitor 105. It is possible to indicate the position of the detection line on the captured image displayed on the monitor 105 in such a case as well. After step S609, a detection unit that the client apparatus 102 has can, automatically or in accordance with a user instruction, count a number of objects that pass the detection line 401 on the captured image 106.

In the first embodiment the camera 101 performed distortion correction of the captured image and recording of the detection line, and the client apparatus 102 obtained the information of the position of the detection line and the captured image, and performed detection of objects that pass the detection line. However, distortion correction, recording of the detection line, and the object detection may be performed by either of the camera 101 and the client apparatus 102. For example, in one embodiment, the camera 101 performs transmission of the captured image to the client apparatus 102, and the client apparatus 102 performs distortion correction, recording of the detection line, and object detection. In another embodiment, the camera 101 performs distortion correction, recording of the detection line, and the object detection, and the client apparatus 102 performs an image display and obtaining a user input.

In addition, in the first embodiment, explanation was primarily given of a case of setting a position of the detection line on the captured image. However, application examples of a method of the present invention are not limited to setting the position of the detection line. In other words, by using the method of the first embodiment, it is possible to more accurately designate a desired position on a captured image that includes distortion. In addition, by using the method of the first embodiment, it is possible to designate a position of a point or a position of a region (including a shape and a magnitude), in addition to a line. In addition, in object detection, it is possible to count a number of objects that enter a designated region, in addition to count a number of objects that pass a detection line.

To eliminate a sense of unnaturalness of a surveillant who views an image of a wide range such as a wide-angle image or an omnidirectional image, it is also effective to further correct a misalignment of a center position of an image due to the optical system, and cause a viewer and the center position to match. In addition, the present embodiment is similarly applicable even if an effective area of an image capturing element is caused to increase by setting an image circle to be an elliptical shape instead of a precise circle shape, and an omnidirectional lens that causes a peripheral resolution to improve is used to perform image capturing.

[Second Embodiment]

Figure 7:
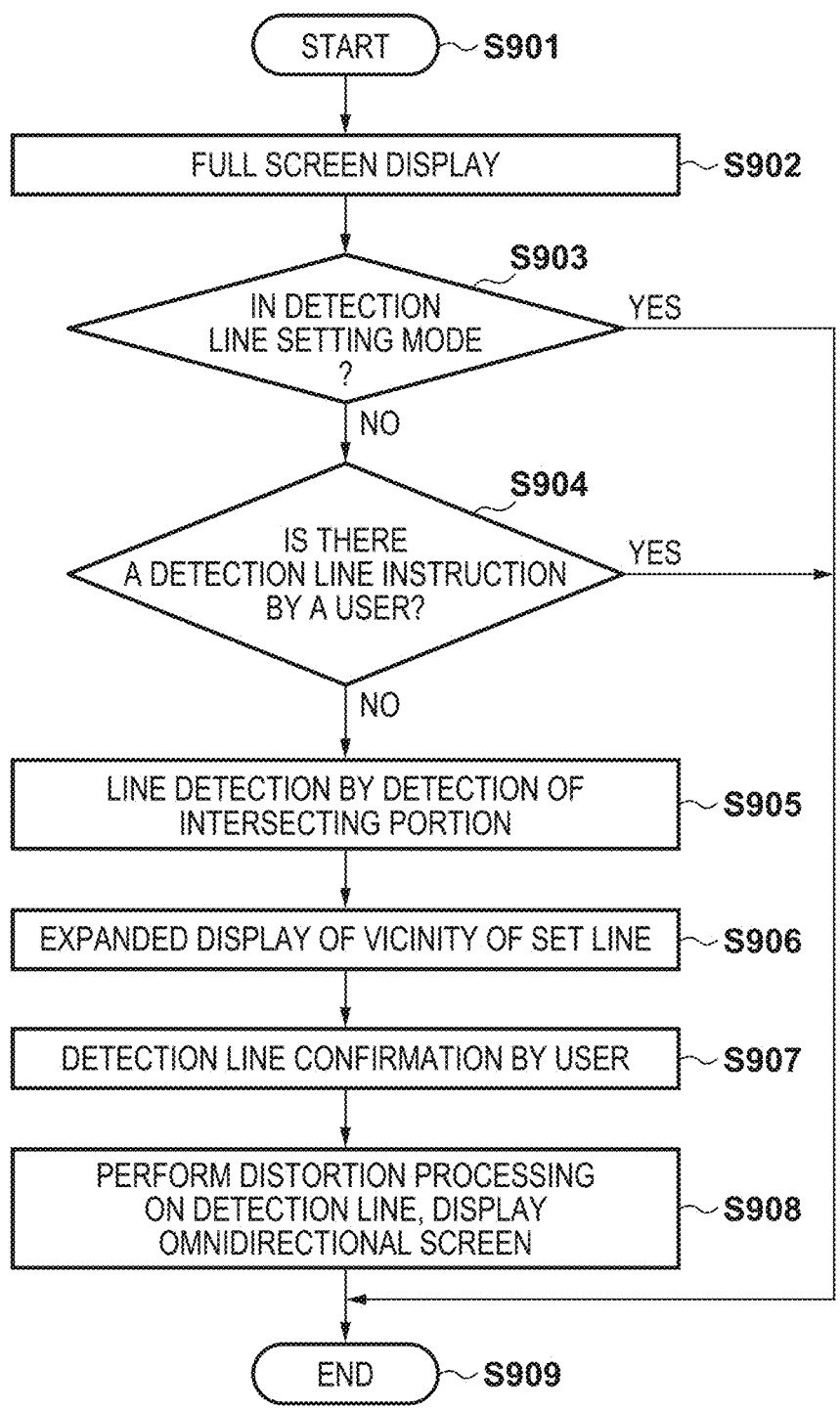
FIG. 7 is a flowchart of processing according to a second embodiment.
Figure 8:
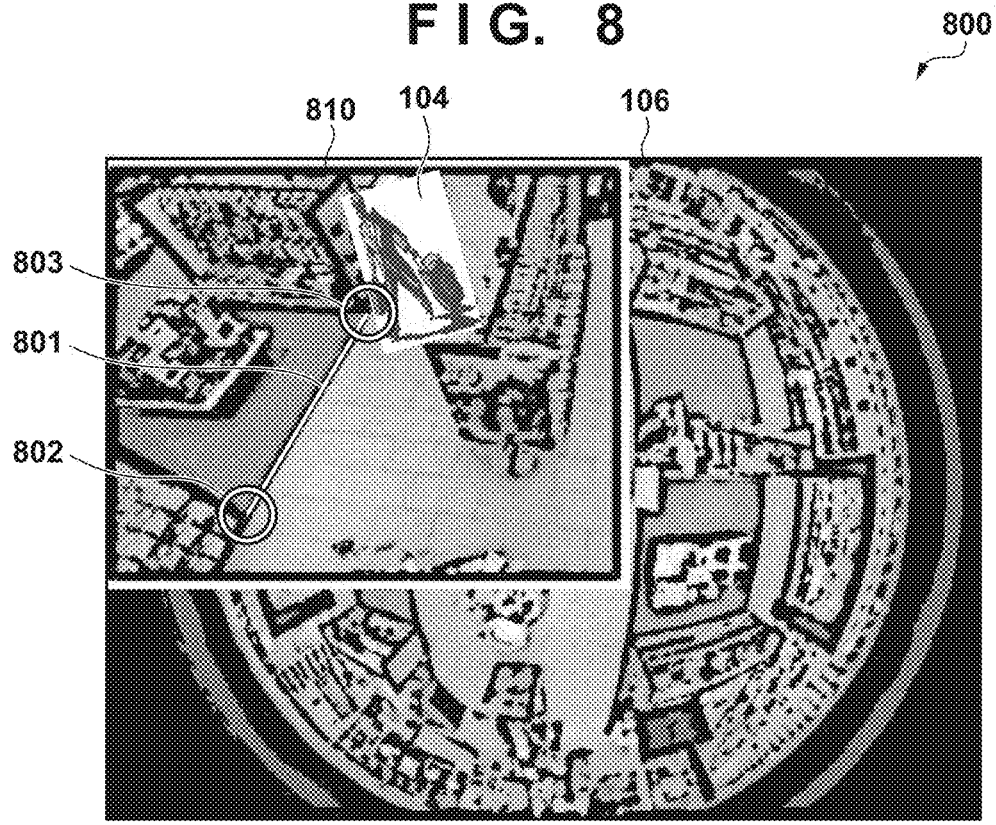
FIG. 8 is a view for illustrating an example of a display in the client apparatus according to the second embodiment.

In the second embodiment, the detection line is automatically corrected by referring to the corrected partial region image before the user corrects the detection line. Below, explanation of the present embodiment is given with reference to FIG. 7-FIG. 9. A configuration of the image capture system 100 according to the present embodiment is similar to that of the first embodiment, and explanation thereof is omitted.

Figure 9:
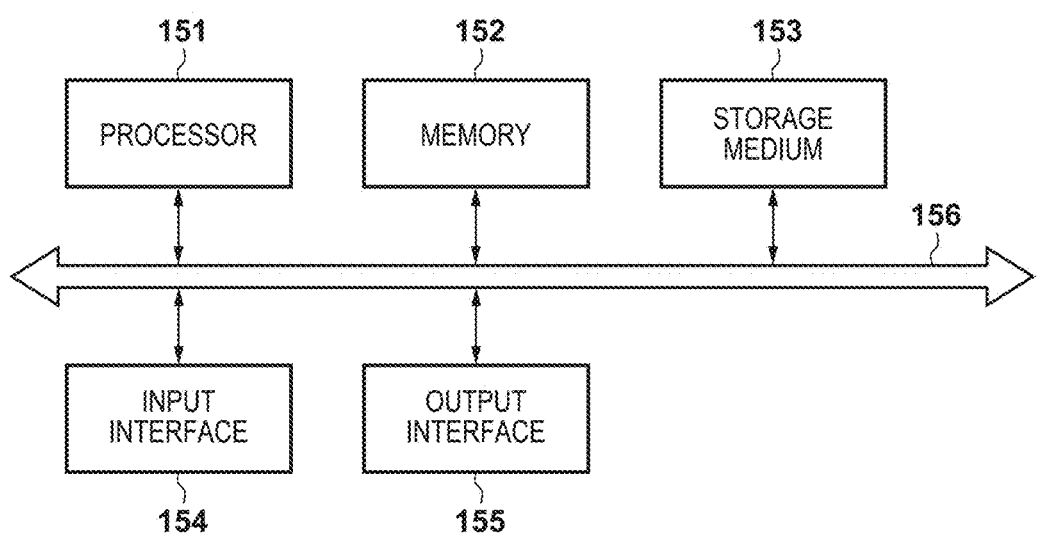
FIG. 9 is an overview block diagram that illustrates a configuration of a computer according to a third embodiment.

FIG. 9 is a flowchart of processing according to this embodiment. Step S901 to step S904 are performed similarly to step S601 to step S604 of the first embodiment.

In step S905, a line correction unit 1002 corrects the detection line. Below, it is assumed that the user has designated the position of the detection line 203 on the captured image 106 as illustrated in FIG. 2. With this the line correction unit 1002 refers to a position of an object on the image to correct the position of the detection line. In one embodiment, the line correction unit 1002 can correct the position of the detection line by referring to outline information of the object. Outline information of the object can be obtained by, for example, performing edge extraction processing on the image.

The following are given as a method for correcting the position of the detection line. For example, it is possible to correct a position of a detection line so as to follow a boundary between objects on the image, such as a path or a corridor. As one example, explanation is given of a case in which the colors of two paths differ and a detection line is positioned in the vicinity of boundaries of the paths whose colors differ. In such a case, after performing edge extraction processing on the image, the line correction unit 1002 can search for an edge pixels closest to each pixel of the detection line that is positioned in a normal direction from the detection line. A detection line 801 after correction is comprised by each edge pixel that was found. In accordance with such a method, it is possible to set the detection line along a path boundary.

In addition, it is possible to detect an edge pixel group that is positioned on an extended line of the detection line or in the vicinity of the extended line, and calculate an approximate curve that passes through the edge pixel group. It is possible to search for a pixel that is on an approximate curve closest to each pixel of the detection line and is positioned in the normal direction of the detection line. A detection line after correction is comprised by each pixel that is found. In the example of FIG. 2, in the neighborhood of the extended line of the detection line, edges of the store shelves 201 and 202 are present. Accordingly, it is possible to correct the position of the detection line, based on an approximate curve that passes through the edges of the store shelves 201 and 202. In accordance with such a method, it is possible to set the detection line along an entrance of a path.

As a separate method for correcting the position of the detection line, it is possible to correct the position of the detection line so that an end point of the detection line after correction contacts an object on the image. As an example, it is possible to detect a pair of edge pixels that are respectively closest to the two ends of the detection line. It is then possible to extend, shorten, and move the detection line so that the detected pair of edge pixels becomes the two ends of the detection line after correction. In the example of FIG. 2, in the neighborhoods of the two ends of the detection line, edges of the store shelves 201 and 202 are present. Accordingly, it is possible to correct the position of the detection line so as to connect with an edge of the store shelf 201 and an edge of the store shelf 202. In accordance with such a method, it is possible to set the detection line to match the width of the path.

Additionally it is possible to correct the position of the detection line so that an end point of the detection line after correction contacts a corner of an object on the image. For example, as illustrated in screen 800 in FIG. 8, it is possible to extend the detection line so that both sides of the detection line 801 contact corners 802 and 803 of the store shelves. As an example of a specific method therefor, it is possible to detect the corners of a pair of objects that are respectively closest to both ends of the detection line. A corner of an object can be defined as a point at which two or more edges of different directions contact for example. It is then possible to extend, shorten, and move the detection line so that the detected pair of corners become the two ends of the detection line after correction. In the example of FIG. 2, in the neighborhoods of the two ends of the detection line, edges of the store shelves 201 and 202 are present. Accordingly, it is possible to correct the position of the detection line so as to connect with an corner of the store shelf 201 and a corner of the store shelf 202. In accordance with such a method, it is possible to set the detection line to match the entrance of the path and the width thereof.

The line correction unit 1002 can correct the designated position of the detection line 203 on the captured image by referring to the captured image 106. In such a case, it is possible to perform the above-described processing by considering image distortion in the captured image 106. For example, if calculating an approximate curve that passes through an edge pixel group as described above, it is possible to determine, in accordance with image distortion at the position of the detection line 203, a curvature factor of the calculated approximate curve so that it becomes a straight line when distortion correction is performed on the calculated approximate curve. In addition, when extending the detection line 203, it is possible to extend the detection line 203 along an extension curve determined so to become a straight line when performing distortion correction in accordance with distortion of an image at a position of the detection line 203.

In another embodiment, the line correction unit 1002 can correct, with reference to a corrected partial region image 810, a position on the corrected partial region image that corresponds to a designated position of the detection line 203 on the captured image. The line correction unit. 1002 can perform the above-described processing with reference to the corrected partial region image 810. Similarly to the first embodiment, the corrected partial region image 810 is an image obtained by performing distortion correction on the captured image 106, and includes a position of a detection line designated on the captured image. In addition, similarly to the first embodiment, the configuring unit 1001 can calculate a position of the detection line on the corrected partial region image 810, and can correct the position of the detection line on the corrected partial region image 810. In such a case, if calculating an approximate curve that passes through the edge pixel group as described above, it is possible to calculate an approximate line that passes through the edge pixel group as an approximate curve. In addition, if extending the detection line, it is possible to extend the detection line along a straight line that approximates the detection line.

Step S906 can be performed similarly to step S605 of the first embodiment. In step S907, the controller 509 receives, via the client apparatus 102, a user input that indicates whether to approve a position of the detection line 801 after correction. If a user does not approve the position of the detection line 801 after correction, similarly to step S606 of the first embodiment, the user may correct the position of the detection line 801. When satisfied with the position of the detection line 801, the user can approve the position of the detection line 801 after correction. Thereafter, the detection line is set at a position on the captured image that corresponds to a position of the approved detection line 801. When a user approves the position for the detection line 801 after correction, the processing proceeds to step S908.

Step S908 and step S909 can be performed similarly to step S608 and step S609 of the first embodiment.

[Third Embodiment]

In the above described embodiment, each processing unit shown in, for example, FIG. 1 or the like is realized by dedicated hardware. However, all or a part of the processing units that the camera 101 and the client apparatus 102 have may be realized by a computer. In the present embodiment, at least a portion of the processing according to each of the above described embodiments is executed by a computer.

FIG. 9 is a view that illustrates a basic configuration of a computer. A processor 151 in FIG. 9 is, for example, a CPU, and it controls operation of a computer overall. A memory 152 is for example a RAM, and temporarily stores a program, data, and the like. A computer-readable storage medium 153 is, for example, a hard disk, a CD-ROM, or the like, and stores a program, data, and the like for a long period. In the present embodiment, a program that realizes functions of each unit and is stored in the storage medium 153 is read into the memory 152. The functions of each unit are then realized by the processor 151 operating in accordance with the program in the memory 152.

In FIG. 9, an input interface 154 is an interface for obtaining information from an external apparatus. Also, an output interface 155 is an interface for outputting information to an external apparatus. A bus 156 is connected to each unit described above, and can exchange data.

Embodiments of the present invention are explained above, but the present invention is not limited to these embodiments, and various modifications and changes are possible within a scope of their spirit. For example, the distortion correction unit 504, the OSD 505, the configuring unit 1001, and the line correction unit 1002, which are illustrated in FIG. 5, may be comprised by the client apparatus 102. In such a case, the client apparatus 102 can apply the detection line position setting of the present invention to a wide-angle captured image that is recorded in the recording server 511.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-067464, filed Mar. 27, 2015, which is hereby incorporated by reference herein in its entirety.

What is claimed is:

1. An information processing apparatus comprising:
a memory configured to store instructions; and
a processor configured to execute the instructions to perform:
receiving a designation of a position for setting a passage detection line, for detecting a passage of a moving object, on an omnidirectional image captured by an image capture apparatus;
generating a corrected partial region image that is obtained by performing a distortion correction that reduces a distortion, wherein the corrected partial region image includes the position designated on the omnidirectional image;

receiving an information of the passage detection line on the corrected partial region image in accordance with a designation by a user;

converting the received information of the passage detection line into information of a passage detection line on the omnidirectional image;

generating an image of the passage detection line based on the information of the passage detection line on the omnidirectional image obtained by the converting; and superimposing the generated image of the passage detection line on the omnidirectional image.

2. The information processing apparatus according to claim 1, wherein the processor is further configured to execute the instructions to perform automatically generating the information of a provisional passage detection line on the corrected partial region image at a position corresponding to the position designated on the omnidirectional image, without a user's designation of a position on the corrected partial region image.

3. The information processing apparatus according to claim 2, wherein the received information of the passage detection line is provided by a user as a correction to the position of the provisional setting line which is displayed on the corrected partial region image.

4. The information processing apparatus according to claim 2, wherein the processor is further configured to execute the instructions to perform:

automatically correcting, with reference to the omnidirectional image, a position designated on the omnidirectional image, without a user's designation of the corrected position on the omnidirectional image; or automatically correcting, with reference to the corrected partial region image, the position corresponding to the position designated on the omnidirectional image, without a user's designation of a corrected position on the corrected partial region image.

5. The information processing apparatus according to claim 4, wherein the correcting comprises:

correcting the position designated on the omnidirectional image by using outline information of an object in an image, the object being detected from the omnidirectional image; or correcting the position corresponding to the position designated on the omnidirectional image by using outline information of an object in an image, the object being detected from the corrected partial region image.

6. The information processing apparatus according to claim 1, wherein the processor is further configured to execute the instructions to perform:

detecting an object that passes the passage detection line in a moving image, the moving image including omnidirectional images captured by the image capture apparatus.

7. The information processing apparatus according to claim 1, wherein the received information of the passage detection line is converted into the information of the passage detection line on the omnidirectional image, such that the passage detection line on the corrected partial region image represented by the received information of the passage detection line is distorted to provide the passage detection line on the omnidirectional image represented by the information of the passage detection line on the omnidirectional image.

8. An information processing method comprising:

receiving a designation of a position for setting a passage detection line, for detecting a passage of a moving object, on an omnidirectional image captured by an image capture apparatus;

generating a corrected partial region image that is obtained by performing a distortion correction that reduces a distortion, wherein the corrected partial region image includes the position designated on the omnidirectional image;

receiving an indication of the passage detection line on the corrected partial region image in accordance with a designation by a user;

converting the received information of the passage detection line into information of a passage detection line on the omnidirectional image;

generating an image of the passage detection line based on the information the passage detection line on the omnidirectional image obtained by converting; and superimposing the generated image of the passage detection line on the omnidirectional image.

9. The information processing method according to claim 8, further comprising automatically generating the information of a provisional passage detection line on the corrected partial region image at a position corresponding to the position designated on the omnidirectional image, without a user's designation of a position on the corrected partial region image.

10. The information processing method according to claim 9, wherein the received information of the passage detection line is provided by a user as a correction to the position of the provisional setting line which is displayed on the corrected partial region image.

11. The information processing method according to claim 9, further comprising:

automatically correcting, with reference to the omnidirectional image, a position designated on the omnidirectional image, without a user's designation of the corrected position on the omnidirectional image; or automatically correcting, with reference to the corrected partial region image, the position corresponding to the position designated on the omnidirectional image, without a user's designation of a corrected position on the corrected partial region image.

12. The information processing method according to claim 11, wherein the correcting comprises:

correcting the position designated on the omnidirectional image by using outline information of an object in an image, the object being detected from the omnidirectional image; or correcting the position corresponding to the position designated on the omnidirectional image by using outline information of an object in an image, the object being detected from the corrected partial region image.

13. The information processing method according to claim 8, further comprising:

detecting an object that passes the passage detection line in a moving image, the moving image including omnidirectional images captured by the image capture apparatus.

14. A non-transitory computer-readable medium storing a program thereon, the program causing a computer to perform a method comprising:

receiving a designation of a position for setting a passage detection line, for detecting a passage of a moving object, on an omnidirectional image captured by an image capture apparatus;

generating a corrected partial region image that is obtained by performing a distortion correction that reduces a distortion, wherein the corrected partial region image includes the position designated on the omnidirectional image;

receiving an indication of the passage detection line on the corrected partial region image in accordance with a designation by a user;

converting the received information of the passage detection line into information of a passage detection line on the omnidirectional image;

generating an image of the passage detection line based on the information the passage detection line on the omnidirectional image obtained by converting; and superimposing the generated image of the passage detection line on the omnidirectional image.

15. The medium according to claim 14, wherein the method further comprises automatically generating the information of a provisional passage detection line on the corrected partial region image at a position corresponding to the position designated on the omnidirectional image, without a user's designation of a position on the corrected partial region image.

16. The medium according to claim 15, wherein the received information of the passage detection line is provided by a user as a correction to the position of the provisional setting line which is displayed on the corrected partial region image.

17. The medium according to claim 15, wherein the method further comprises:

automatically correcting, with reference to the omnidirectional image, a position designated on the omnidirectional image, without a user's designation of the corrected position on the omnidirectional image; or automatically correcting, with reference to the corrected partial region image, the position corresponding to the position designated on the omnidirectional image, without a user's designation of a corrected position on the corrected partial region image.

18. The medium according to claim 17, wherein the correcting comprises:

correcting the position designated on the omnidirectional image by using outline information of an object in an image, the object being detected from the omnidirectional image; or correcting the position corresponding to the position designated on the omnidirectional image by using outline information of an object in an image, the object being detected from the corrected partial region image.

19. The medium according to claim 14, wherein the method further comprises:

detecting an object that passes the passage detection line in a moving image, the moving image including omnidirectional images captured by the image capture apparatus.

* * * * *